United States Patent
Ukai et al.

(10) Patent No.: US 8,262,756 B2
(45) Date of Patent: Sep. 11, 2012

(54) HYDROGEN GENERATOR, METHOD OF OPERATING HYDROGEN GENERATOR, AND FUEL CELL SYSTEM

(75) Inventors: Kunihiro Ukai, Nara (JP); Kiyoshi Taguchi, Osaka (JP); Hidenobu Wakita, Kyoto (JP); Seiji Fujihara, Hyogo (JP); Yukimune Kani, Osaka (JP); Yumi Kondo, Osaka (JP)

(73) Assignee: Panasonic Corporation, Osaka (JP)

( * ) Notice: Subject to any disclaimer, the term of this patent is extended or adjusted under 35 U.S.C. 154(b) by 1356 days.

(21) Appl. No.: 10/586,530

(22) PCT Filed: Jul. 20, 2005

(86) PCT No.: PCT/JP2005/013269
§ 371 (c)(1),
(2), (4) Date: Jul. 19, 2006

(87) PCT Pub. No.: WO2006/009153
PCT Pub. Date: Jan. 26, 2006

(65) Prior Publication Data
US 2007/0154750 A1    Jul. 5, 2007

(30) Foreign Application Priority Data
Jul. 20, 2004 (JP) .................. 2004-211782

(51) Int. Cl.
*H01M 8/06* (2006.01)
*C01B 3/36* (2006.01)
(52) U.S. Cl. ........ 48/197 R; 429/420; 429/423; 429/427
(58) Field of Classification Search ........... 700/266–274
See application file for complete search history.

(56) References Cited

U.S. PATENT DOCUMENTS

| | | | |
|---|---|---|---|
| 2001/0002248 A1* | 5/2001 | Ukai et al. ............... | 423/652 |
| 2003/0003033 A1 | 1/2003 | Taguchi et al. | |
| 2003/0108456 A1 | 6/2003 | Ukai et al. | |
| 2003/0175562 A1* | 9/2003 | Taguchi et al. .......... | 429/19 |
| 2005/0129997 A1* | 6/2005 | Maenishi et al. ........ | 429/20 |

FOREIGN PATENT DOCUMENTS

| | | |
|---|---|---|
| JP | 2003217636 | 7/2003 |
| JP | 2004220949 | 8/2004 |
| JP | 2005116311 | 4/2005 |
| WO | 0147802 | 7/2001 |
| WO | 0226620 | 4/2002 |

OTHER PUBLICATIONS

PCT International Search Report dated Oct. 25, 2005.

\* cited by examiner

*Primary Examiner* — Imran Akram
(74) *Attorney, Agent, or Firm* — Dickinson Wright PLLC

(57) ABSTRACT

A hydrogen generator that is able to maintain an ability to supply a reformed gas containing less CO for a long time period while dealing with degradation of a catalytic activity of a shift reaction by a reliable and simple method, an operation method thereof, and a fuel cell system are provided. In a hydrogen generator (50) comprising a reformer (1), a shift converter (6), a water supply device (3A), a material feed device (2A), and a controller (12), the controller (12) is configured to count the number of times of start-up and/or stop of said hydrogen generator (50) and to increase a temperature or a S/C ratio of the reformed gas flowing in said shift converter (6) according to the counted number of times of start-up and/or stop.

4 Claims, 12 Drawing Sheets

| n \ h          | h<19999 | 20000≦h |
|----------------|---------|---------|
| 2000≦n         | 210     | 210     |
| 1000≦n<1999    | 200     | 210     |
| 500≦n<999      | 190     | 200     |
| 1≦n<499        | 180     | 190     |

Fig. 7

HYDROGEN GENERATOR, METHOD OF OPERATING HYDROGEN GENERATOR, AND FUEL CELL SYSTEM

TECHNICAL FIELD

The present invention relates to a hydrogen generator, an operation method thereof, and a fuel cell system. More particularly, the present invention relates to a hydrogen generator configured to conduct a shift reaction by a catalytic action and repeat start-up and stop, an operation method thereof, and a fuel cell system.

BACKGROUND ART

In a conventional method to reduce carbon monoxide (hereinafter also referred to as CO) in a reformed gas resulting from steam reforming of a material including an organic compound containing at least carbon and hydrogen, a water-shift reaction (hereinafter referred to as a "shift reaction") using steam and CO is promoted. To be specific, a shift reaction of an air-fuel mixture containing the reformed gas and the steam is typically promoted under a shift reaction temperature condition, using a noble metal catalyst such as platinum, ruthenium, or rhodium, a Cu—Zn catalyst, or a Fe—Cr catalyst. The shift reaction temperature condition of the shift reaction is approximately 100° C. to 250° C. The catalytic activity of the catalyst degrades depending on an environment or with time. Especially, at low temperatures, the catalytic activity significantly degrades. So, a hydrogen generator capable of maintaining the catalytic activity has been proposed. To be specific, the hydrogen generator operates so as to increase a flow rate of water, decrease a flow rate of the reformed gas, or increase a temperature of the catalyst when the catalytic activity has degraded (see, for example, patent document 1). In order to determine whether or not the catalytic activity has degraded, there has been proposed a technique using a CO sensor (see patent document 1), or a determination device (see patent document 2) that simply makes determination by utilizing a temperature change at a predetermined portion of the hydrogen generator has been proposed.

Patent document 1: Domestic re-publication of PCT international publication for patent application No. 02/026620
Patent document 2: Japanese Laid-Open Patent Application Publication No. 2003-217636

DISCLOSURE OF THE INVENTION

Problems to be Solved by the Invention

The determination device that simply determines whether or not the catalytic activity of the shift reaction has degraded based on the temperature change and the hydrogen generator equipped with the determination device are required to further improve reliability. For example, in the determination device that utilizes the temperature change in the predetermined portion of the hydrogen generator, a great temperature change may in some cases take place depending on the flow rate of the reformed gas. Such degradation of reliability may lead to unnecessary adjustment of the catalytic temperature, the water flow rate, the reformed gas flow rate, and so on, resulting in degraded performance of the hydrogen generator. Therefore, there is still a room for improvement in a method of improving performance of the hydrogen generator.

The present invention has been developed to solve the above mentioned problem, and an object of the present invention is to provide a hydrogen generator that is capable of maintaining an ability to supply a reformed gas containing less CO for a long time period while dealing with degradation of a catalytic activity of a shift reaction with a reliable and simple method, an operation method thereof, and a fuel cell system.

Means for Solving the Problem

In order to achieve the above mentioned objective, a hydrogen generator of a first invention comprises a reformer configured to conduct a steam reforming reaction to reform a material to generate a reformed gas containing carbon monoxide, water and hydrogen; a shift converter configured to conduct a shift reaction using the carbon monoxide and steam in the reformed gas; a water supply device configured to supply the water to the reformer; a material feed device configured to feed the material to the reformer; and a controller configured to count the number of times of start-up and/or stop of the hydrogen generator and to increase a temperature or a S/C ratio of the reformed gas flowing in the shift converter according to the counted number of times of start-up and/or stop.

In such a configuration, since the temperature of the shift reaction or the S/C ratio is increased based on the number of times of start and/or stop of the shift reaction, it possible to maintain an ability to supply a reformed gas containing less CO for a long time period while dealing with degradation of the catalytic activity of the shift reaction with a reliable and simple method. As used herein, the term "S/C ratio" refers to a ratio in molecular and atomic masses between water ($H_2O$) and carbon (C) in the reformed gas, namely, a steam/carbon ratio. Also, the terms "start-up and/or stop of the hydrogen generator" include start-up and/or stop of a part of the hydrogen generator including the shift converter.

In order to surely achieve the effects of the present invention, the hydrogen generator of a second invention may further comprise a reformed gas temperature adjusting device configured to cool and heat the reformed gas flowing into the shift converter; wherein the controller controls the reformed gas temperature adjusting device to increase the temperature of the reformed gas according to the counted number of times of start-up and/or stop.

In order to achieve the effects of the present invention, in the hydrogen generator of a third invention, the controller controls the water supply device and the material feed device to increase the S/C ratio of the reformed gas according to the counted number of times of start-up and/or stop.

The hydrogen generator of a fourth invention may further comprise a reformed gas temperature adjusting device configured to cool and heat the reformed gas flowing into the shift converter; wherein the controller counts an accumulated operation time of the hydrogen generator, and controls the reformed gas temperature adjusting device to increase the temperature of the reformed gas according to the counted number of times of start-up and/or stop and the counted accumulated operation time of the hydrogen generator.

In the hydrogen generator of a fifth invention, the controller may count an accumulated operation time of the hydrogen generator, and control the water supply device and the material feed device to increase the S/C ratio of the reformed gas according to the counted number of times of start-up and/or stop and the counted accumulated operation time of the hydrogen generator.

In such a configuration, since the temperature of the shift reaction or the S/C ratio is increased based on the number of times of start and/or stop of the shift reaction, and the accumulated operation time, it possible to maintain an ability to supply a reformed gas containing less CO for a long time period while dealing with degradation of the catalytic activity of the shift reaction with a reliable and simple method.

The hydrogen generator of a sixth invention may further comprise a temperature detector configured to detect the temperature of the reformed gas at an inlet of the shift converter from which the reformed gas flows into the shift converter; wherein, at re-start-up after stop of the hydrogen generator, the controller obtains a detected value from the temperature detector, compares the detected value to a temperature condition of water condensation, and counts the number of times of start-up and/or stop of the hydrogen generator when the detected value matches the temperature condition of water condensation.

In such a configuration, since the temperature of the shift reaction is increased based on possibility of water condensation in the interior of shift converter in addition to the number of times of start and/or stop of the shift reaction, an unnecessary increase in the temperature of the shift reaction or the S/C ratio can be suppressed. The hydrogen generator is able to maintain an ability to supply a reformed gas containing less CO for a long time period while suitably dealing with degradation of a catalytic activity of the shift reaction with a reliable and simple method.

In the hydrogen generator of seventh and eighth inventions, the controller pre-stores controlled temperature data or controlled S/C ratio data such that a controlled temperature or a controlled S/C ratio corresponds to the number of times of start-up and/or stop; and the controller selects the controlled temperature or the controlled S/C ratio from the controlled temperature data or the controlled S/C ratio data according to the counted number of times of start-up and/or stop, and controls the reformed gas temperature adjusting device so that the temperature of the reformed gas becomes the selected controlled temperature or controls the water supply device and the material feed device so that the S/C ratio of the reformed gas becomes the selected controlled S/C ratio.

In such a configuration, since the increase in the temperature of the shift reaction or the increase in the S/C ratio is controlled more correctly while predicting degradation of the catalytic activity of the shift reaction, the CO concentration of the reformed gas after the shift reaction can be kept lower.

In the hydrogen generator of ninth and tenth inventions, the controller may count the accumulated operation time of the hydrogen generator; the controller selects the controlled temperature or a controlled S/C ratio from the controlled temperature data or the controlled S/C ratio data according to the counted number of times of start-up and/or stop and the counted accumulated operation time and controls the reformed gas temperature adjusting device so that a detected temperature from the temperature detector becomes the selected controlled temperature or controls the water supply device and the material feed device so that the S/C ratio of the reformed gas becomes the selected controlled S/C ratio.

In such a configuration, since the shift reaction can be controlled in view of degradation of the catalytic activity that tends to occur with the accumulated operation time, the increase in the temperature of the shift reaction or the increase in the S/C ratio can be controlled more correctly, and the CO concentration of the reformed gas after the shift reaction can be kept lower.

In the hydrogen generator of eleventh and twelfth inventions, the controller stores controlled temperature data or controlled S/C ratio data such that the controlled temperature or the controlled S/C ratio corresponds to the number of times of start-up and/or stop and the accumulated operation time, selects the controlled temperature or the controlled S/C ratio from the controlled temperature data or the controlled S/C ratio data according to the counted number of times of start-up and/or stop and the counted accumulated operation time, and controls the reformed gas temperature adjusting device so that the detected temperature from the temperature detector becomes the selected controlled temperature or controls the water supply device and the material feed device so that the S/C ratio of the reformed gas becomes the selected controlled S/C ratio.

In such a configuration, the increase in the temperature of the shift reaction or the increase in the S/C ratio can be controlled more correctly while predicting degradation of the catalytic activity of the shift reaction.

The hydrogen generator of thirteenth and fourteenth inventions may further comprise an oxidizing agent supply device configured to add an oxidizing agent to the reformed gas that has flowed through the shift converter; and a carbon monoxide selective oxidation device configured to conduct selective oxidation using the carbon monoxide and the oxidizing agent in the reformed gas; wherein the controller pre-stores carbon monoxide concentration data such that a carbon monoxide concentration of the reformed gas after the shift reaction at the controlled temperature or in the controlled S/C ratio is associated with the controlled temperature or the controlled S/C ratio; and wherein the controller selects a carbon monoxide concentration corresponding to the selected controlled temperature or the selected controlled S/C ratio from the carbon monoxide concentration data, calculates a controlled oxidizing agent flow rate from a reformed gas flow rate and the selected carbon monoxide concentration, and controls the oxidizing agent supply device to add the oxidizing agent to the reformed gas with the controlled oxidizing agent flow rate.

In such a configuration, since the carbon monoxide selective oxidation can be carried out while predicting the CO concentration of the reformed gas after the shift reaction corresponding to the controlled temperature or the controlled S/C ratio, the CO concentration of the reformed gas can be reduced.

In the hydrogen generator of a fifteenth invention, the reformed gas temperature adjusting device may be configured to adjust the temperature of the reformed gas by water-cooling the reformed gas in a reformed gas passage through which the reformer and the shift converter communicate with each other, and water that has cooled the reformed gas may be supplied to the reformer.

In such a configuration, since the temperature of the water supplied to the reformer increases, energy consumed to evaporate water in the reformer can be reduced, and thus energy to be supplied to the heater can be reduced. As a result, energy efficiency can be increased.

A fuel cell system of a sixteenth invention comprises a fuel cell; and a hydrogen generator according to claim 1; the hydrogen generator being configured to supply as a fuel gas, to the fuel cell, a reformed gas that has flowed through the shift converter, and being configured to start-up and stop in association with an operation of the fuel cell and to adjust a supply amount of the reformed gas according to a power output of the fuel cell; wherein the controller of the hydrogen generator is configured to count the number of times of start-up and/or stop of the fuel cell.

In such a configuration, since the hydrogen generator operates in association with a fuel cell, the fuel cell system is able to achieve efficient and rational operation.

A fuel cell system of seventeenth and eighteenth inventions comprises a fuel cell; and a hydrogen generator according to claim 9 or 10; the hydrogen generator being configured to supply as a fuel gas, to the fuel cell, a reformed gas that has flowed through the shift converter, and being configured to start-up and stop in association with an operation of the fuel cell and to adjust a supply amount of the reformed gas according to a power output of the fuel cell; wherein the controller of the hydrogen generator is configured to count the number of times of start-up and/or stop of the fuel cell and an accumulated operation time of the fuel cell.

In such a configuration, since the hydrogen generator operates in association with the fuel cell, the fuel cell system is able to achieve efficient and rational operation.

In the hydrogen generator of a nineteenth invention, the controller may include an output device that displays or outputs the counted number of times of start-up and/or stop.

In such a configuration, since the number of times of start-up and/or stop of the hydrogen generator can be easily recognized, it is possible to determine any time whether or not to increase the temperature or the S/C ratio of the reformed gas flowing in the shift converter.

The hydrogen generator of a twentieth invention may further comprise a carbon monoxide concentration detector configured to detect a carbon monoxide concentration of the reformed gas that has flowed through the shift converter; wherein the controller pre-stores an upper limit value of the carbon monoxide concentration of the reformed gas; and wherein the controller compares a detected value from the carbon monoxide concentration detector to the upper limit value, and increases the temperature or the S/C ratio of the reformed gas flowing in the shift converter when the detected value is larger than the upper limit value.

Since whether or not to increase the temperature or the S/C ratio of the reformed gas flowing in the shift converter can be determined by detecting the carbon monoxide concentration, the effects of the present invention are able to be surely obtained.

A method of operating a hydrogen generator of a twenty first invention, including a reformer configured to conduct a steam reforming reaction to reform a material to generate a reformed gas containing carbon monoxide, water and hydrogen; a shift converter configured to conduct a shift reaction using the carbon monoxide and steam in the reformed gas; a water supply device configured to supply the water to the reformer; and a material feed device configured to feed the material to the reformer, comprises the steps of: counting the number of times of start-up and/or stop of the hydrogen generator; and increasing a temperature or a S/C ratio of the reformed gas flowing in the shift converter according to the counted number of times of start-up and or stop.

In such a configuration, since the temperature of the shift reaction or the S/C ratio is increased based on the number of times of start and/or stop of the shift reaction, it possible to maintain an ability to supply a reformed gas containing less CO for a long time period while dealing with degradation of the catalytic activity of the shift reaction with a reliable and simple method.

In order to surely achieve the effects of the present invention, in the method of operating a hydrogen generator of a twenty second invention, the hydrogen generator may further include a reformed gas temperature adjusting device configured to cool and heat the reformed gas flowing into the shift converter, the method may further comprise the step of increasing the temperature of the reformed gas by the reformed gas temperature adjusting device.

In order to surely achieve the effect of the present invention, the method of operating a hydrogen generator of a twenty third invention, may further comprise the step of increasing the S/C ratio of the reformed gas by the water supply device and the material feed device.

The method of operating a hydrogen generator of a twenty fourth invention, in which the hydrogen generator further includes an oxidizing agent supply device configured to add an oxidizing agent to the reformed gas that has flowed through the shift converter; and a carbon monoxide selective oxidation device configured to conduct selective oxidation using the carbon monoxide and the oxidizing agent in the reformed gas; may further comprise the steps of: storing controlled temperature data such that a controlled temperature corresponds to the number of times of start-up and/or stop and carbon monoxide concentration data such that a carbon monoxide concentration of the reformed gas after the shift reaction at a controlled temperature is associated with the controlled temperature; selecting the controlled temperature from the controlled temperature data according to the counted number of times of start-up and/or stop; adjusting the temperature of the reformed gas to become the selected controlled temperature by the reformed gas temperature adjusting device; selecting a carbon monoxide concentration corresponding to the selected controlled temperature from the carbon monoxide concentration data; calculating a controlled oxidizing agent flow rate from a reformed gas flow rate and the selected carbon monoxide concentration; and adding an oxidizing agent to the reformed gas with the controlled oxidizing agent flow rate by the oxidizing agent supply device.

In such a configuration, since the carbon monoxide selective oxidation can be carried out while estimating the CO concentration of the reformed gas after the shift reaction corresponding to the temperature of the reformed gas flowing in the shift converter, it is possible to supply the reformed gas with lower CO concentration.

The method of operating a hydrogen generator of a twenty fifth invention, in which the hydrogen generator further includes an oxidizing agent supply device configured to add an oxidizing agent to the reformed gas that has flowed through the shift converter; and a carbon monoxide selective oxidation device configured to conduct selective oxidation using the carbon monoxide and the oxidizing agent in the reformed gas; may further comprise the steps of: storing controlled S/C ratio data such that a controlled S/C ratio corresponds to the number of times of start-up and/or stop and carbon monoxide concentration data such that a carbon monoxide concentration of the reformed gas after the shift reaction corresponding to the controlled S/C ratio is associated with the controlled S/C ratio; selecting the controlled S/C ratio from the controlled S/C ratio data according to the counted number of times of start-up and/or stop; adjusting the S/C ratio of the reformed gas to become the selected controlled S/C ratio by the water supply device and the material feed device; selecting a carbon monoxide concentration corresponding to the selected controlled S/C ratio from the carbon monoxide concentration data; calculating a controlled oxidizing agent flow rate from the reformed gas flow rate and the selected carbon monoxide concentration; and adding an oxidizing agent to the reformed gas with the controlled oxidizing agent flow rate by the oxidizing agent supply device.

In such a configuration, since the carbon monoxide selective oxidation can be carried out while estimating the CO concentration of the reformed gas after the shift reaction corresponding to the S/C ratio of the reformed gas flowing in the shift converter, it is possible to supply the reformed gas with a lower CO concentration.

The method of operating a hydrogen generator of a twenty sixth invention, in which the hydrogen generator includes an output device that displays or outputs the counted number of times of start-up and/or stop, may further comprise the step of increasing the temperature or the S/C ratio of the reformed gas flowing in the shift converter according to display or output of the output device.

In such a configuration, since the number of times of start-up and/or stop of the hydrogen generator can be easily recognized and whether or not to increase the temperature or the S/C ratio of the reformed gas flowing in the shift converter can be determined any time, the operation method of the hydrogen generator can be easily carried out.

The above and further objects and features of the invention will be more fully be apparent from the following detailed description with accompanying drawings.

Effects of the Invention

As described above, in accordance with the hydrogen generator and the fuel cell system of the present invention, the shift reaction condition is adjusted based on the number of times of start-up and or stop of the hydrogen generator, it possible to maintain an ability to supply a reformed gas containing less CO for a long time period while dealing with degradation of a catalytic activity of the shift reaction with a high reliable and simple method.

BRIEF DESCRIPTION OF THE DRAWINGS

FIG. 7 is a view showing a n–h–Tnh data map according to an embodiment 2;

Figure 1:
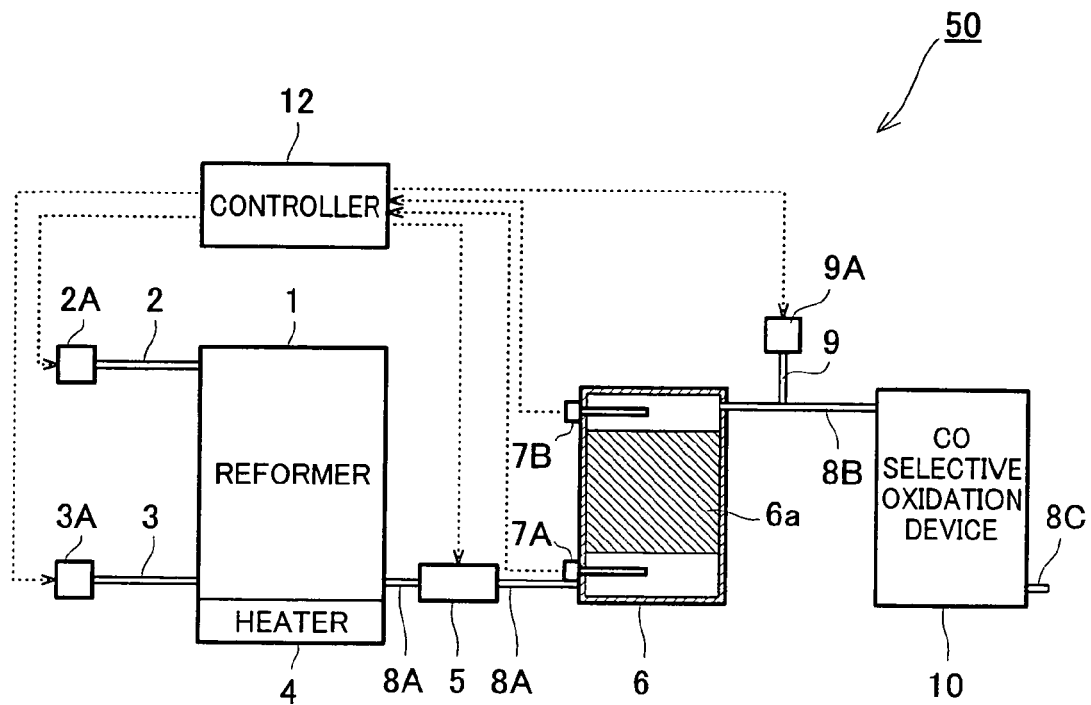
FIG. 1 is a view schematically showing a construction of a hydrogen generator according to an embodiment 1 of the present invention.

EXPLANATION OF REFERENCE NUMERALS 1 reformer
2 material passage
2A material feed device
3 water passage
3A water supply passage
3B bypass water passage
4 heater
5 reformed gas cooler
6 shift converter
6A shift reaction catalyst body
7A inlet temperature detector
7B outlet temperature detector
8A, 8B, 8C reformed gas passage
9 air passage
9A air supply device
10 CO selective oxidation device
12 controller
50, 51, 52, 53 hydrogen generator
100 fuel cell
101 air passage
101A air supply device
102 water condenser
102A condensed water passage
103 off gas passage
104 exhaust air passage
105 operation display/output device
106 CO concentration detector
n number of times of start-up and/or stop
P reformed gas flow rate
Q supplied air flow rate
$Q_n$, $Q_{nh}$ controlled air flow rate
h accumulated operation time
$T_n$, $T_{nh}$ controlled temperature
$T_A$ detected inlet temperature
$T_B$ detected outlet temperature
$T_C$ number determination temperature
$X_n$ CO concentration

BEST MODE FOR CARRYING OUT THE INVENTION

Hereinafter, preferred embodiments of the present invention will be described with reference to the drawings.

Embodiment 1

FIG. 1 is a view schematically showing a hydrogen generator according to an embodiment 1 of the present invention.

A hydrogen generator 50 includes a reformer 1, a shift converter 6, a CO selective oxidation device 10, a material passage 2 and a material feed device 2A that feed a material to the reformer 1, a water passage 3 and a water supply device 3A that supply water to the reformer 1, a heater 4 that supplies heat to the reformer 1, a reformed gas passage 8A through which the reformer 1 communicates with the shift converter 6, a reformed gas cooler (reformed gas temperature adjusting device) 5 disposed on the reformed gas passage 8A, a reformed gas passage 8B through which the shift converter 6 communicates with the CO selective oxidation device 10, an air passage 9 and an air supply device (oxidizing agent supply device) 9A that are configured to add and mix air (oxidizing agent) into a reformed gas in the reformed gas passage 8B, a reformed gas passage 8C through which the CO selective oxidation device 10 communicates with outside supply destination (not shown), and a controller 12.

The reformer 1 is a reactor configured to reform the material into the reformed gas through a steam reforming reaction using the material and the water.

As a catalyst to promote the reforming reaction, a catalyst formed of ruthenium (Ru) carried on an alumina carrier and prepared is used.

As the material, a natural gas, a hydrocarbon component such as LPC; alcohol such as methanol, or a naphtha component may be used. In this embodiment, a natural gas containing methane as a major component is used.

The material feed device 2A includes a booster that increases a feed pressure of the material (natural gas), and a desulfurization portion that decreases a sulfur component in the material. In this embodiment, the desulfurization portion is filled with a zeolite based adsorbing agent that removes a sulfur based smell component in the natural gas.

The natural gas may be replaced by other material such as ethane or propane. Further, a liquid material, for example, alcohol such as methanol or naphtha component may be used by using a dedicated vaporization construction.

The water supply device 3 is configured to supply water resulting from ion exchange. In this embodiment, a plunger pump is used.

The heater 4 includes a flame burner and a sirocco fan (not shown) for supplying a combustion air. As a gas to be heated, the natural gas which is the material or the reformed gas produced is used (passage configuration is not shown).

The reformed gas cooler 5 is configured to cool the reformed gas flowing into the shift converter 6. The reformed gas cooler 5 is disposed on the reformed gas passage 8A and is configured to cool the reformed gas passage 8A by using an air-cooling fan.

To adjust the temperature of the reformed gas, the reformed gas cooler 5 is able to cool the high-temperature reformed gas supplied from the reformer 1 to the shift converter 6.

In an embodiment in which the low-temperature reformed gas is supplied to the shift converter 6, the reformed gas cooler is configured to be able to heat the reformed gas as the reformed gas temperature adjusting device. For example, a heater is configured to heat the reformed gas passage 8A.

While the temperature of the shift reaction is controlled by adjusting the temperature of the reformed gas, the temperature of the shift converter 6 may alternatively be controlled by heat exchange and a heater.

The shift converter 6 is a reactor that is configured to cause the reformed gas to flow in the shift reaction catalyst body 6A to enable the shift reaction to proceed. As the shift reaction catalyst, a noble metal catalyst is used. The shift converter 6 includes an inlet temperature detector 7A that measures a temperature at an inlet (reformed gas inlet) from which the reformed gas flows into the shift converter 6, and an outlet temperature detector 7B that measures a temperature at an outlet from which the reformed gas after the shift reaction flows outside the shift converter 6.

The air supply device 9A is installed to add air to the reformed gas before the CO selective oxidation. Therefore, the air supply device 9A may be installed at an inlet of the CO selective oxidation device 10 or the outlet of the shift converter 6. The air supply device 9A is configured to be able to supply oxygen in amount necessary for CO selective oxidation according to the CO concentration of the reformed gas flowing in the reformed gas passage 8B. The air supply device 9A is installed on the reformed gas passage 8B. As the air supply device 9A, an air pump is used.

The CO selective oxidation device 10 is a reactor in which CO selective oxidation of the reformed gas proceeds by a catalytic action. In this embodiment, as the catalyst, spherical pellet catalyst with a diameter of about 3 mm that is formed of the ruthenium catalyst carried on the alumina carrier and prepared is used.

The controller 12 is configured to control an operation of the hydrogen generator 50. The controller 12 is configured by an arithmetic unit such as a microcomputer, and includes an operation control portion including a CPU or the like, and a storage portion including a memory or the like (not shown).

The operation control portion is configured to control operations of the material feed device 2A, the water supply passage 3A, the air supply device 9A, the heater 4, and the reformed gas cooler 5 by utilizing detected temperatures of the reformer 1, the shift converter 6, and the CO selective oxidation device 10 (to be specific, the inlet temperature detector 7A and the outlet temperature detector 7B, and other temperature detectors are not shown). The operation control portion calculates an accumulated operation time h of the shift reaction catalyst body 6A and the number of times n of start-up and/or stop (hereinafter simply referred to as number of times) of the shift reaction catalyst body 6A. The storage portion stores the accumulated operation time h, the number of times n, and data necessary for the operation of the hydrogen generator 50.

As used herein, the term "controller" refers to a controller group in which a plurality of controllers cooperate with each other to perform control, as well as a single controller. Therefore, the controller 12 is not necessarily constructed of a single controller, but may be constructed of a plurality of controllers that are distributed and cooperate with each other to control the operation of the hydrogen generator 50.

Subsequently, an operation of the hydrogen generator 50 during a running state will be described. The operation of the hydrogen generator 50 is controlled by the controller 12.

First, in the reformer 1, the heater 4, the water supply device 3A, and the material feed device 2A are operated. The material (natural gas containing methane as a major component) is fed in a fixed amount to the heater 4 and combusted therein. In this case, combustion air is supplied to the heater 4 at a flow rate that is 1.5 times as much as a theoretical air flow rate necessary for perfect combustion of methane. Thereby, the catalyst in the interior of the reformer 1 is heated. The temperature of the catalyst in the interior of the reformer 1 is adjusted to be approximately 650° C. The water supply device 3A supplies the water such that 3 mol of water molecules are supplied for one mol of carbon atoms in the material. The material feed device 2A feeds the material to the reformer 1 through the material passage 2. Thereby, in the reformer 1, the steam reforming reaction of the material proceeds. Here, about 85 to 95% of the natural gas which is the material is able to be steam-reformed.

The reformed gas exhausted from the reformer 1 contains about 10 to 14% CO in a dry gas base %. The reformed gas is supplied to the shift converter 6 through the reformed gas passage 8A.

The reformed gas cooler 5 is operated according to at least one of the detected inlet temperature TA from the inlet temperature detector 7A and the detected outlet temperature TB from the outlet temperature detector 7B. Thus, the shift reaction proceeds under the condition in which temperature of the shift reaction catalyst body 6A in the interior of the shift converter 6 is controlled.

The reformed gas exhausted from the shift converter 6 contains about 0.3% to 0.4% CO in a dry gas base %. The reformed gas is supplied to the CO selective oxidation device 10 through the reformed gas passage 8B.

The air-supply device 9A supplies air to the reformed gas flowing in the reformed gas passage 8B through the air passage 9. Because the CO selective oxidation is an exothermic reaction, the temperature in the interior of the CO selective oxidation device 10 is controlled to be suitable for the CO selective oxidation by using an air cooler (not shown), in this embodiment, 150° C.

The reformed gas is exhausted from the CO selective oxidation device 10 and is supplied to outside, for example, a fuel cell, through the reformed gas passage 8C. The CO concentration of the reformed gas in the reformed gas passage 8C is reduced to approximately 20 ppm in a dry gas state.

Subsequently, operations at stop and re-start-up of the hydrogen generator 50 will be described. In this embodiment, the operation of the hydrogen generator 50 is controlled by the controller 12.

First of all, a background of a conception of the invention discovered by inventors will be described.

The inventors found that the catalytic activity of the shift reaction catalyst body 6A degrades depending on the number of times of start and/or stop of the shift reaction. Hereinbelow, a relationship between the number of times of start and/or stop of the shift reaction and the CO concentration of the reformed gas after the shift reaction will be described.

Figure 2:
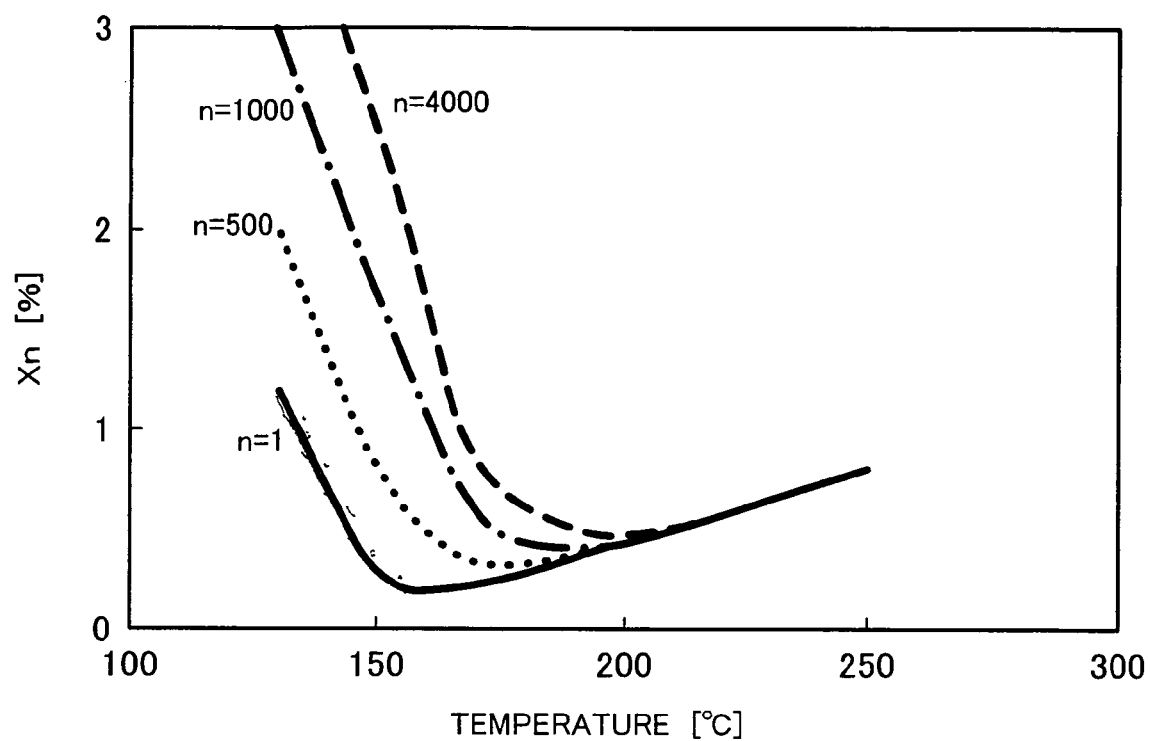
FIG. 2 is a view showing a relationship between the number of times of start and/or stop of a shift reaction and a CO concentration of a reformed gas after the shift reaction, in a performance test using a shift reaction catalyst body of FIG. 1.

FIG. 2 is a view showing a relationship between the number of times of start and/or stop of the shift reaction and the CO concentration of the reformed gas after the shift reaction, in a performance test using the shift reaction catalyst body of FIG. 1. In FIG. 2, CO concentration $X_n$ of the reformed gas after the shift reaction is indicated by an envelop curve for each predetermined number of times n.

The performance test was carried out by simulating the hydrogen generator 50. This made it possible to obtain a correct relationship between the number of times of start and/or stop of the shift reaction and the CO concentration of the reformed gas after the shift reaction. In this test, the shift reaction catalyst body 6A was installed in a normal-pressure fixed-bed flow reaction pipe and the reformed gas containing CO and steam was flowed therein. The start and stop of the shift reaction were repeated while keeping the temperature in the interior of the normal-pressure fixed-bed flow reaction pipe constant. After a predetermined umber of times n (1, 500, 1000, and 4000), the CO concentration $X_n$ of the reformed gas after the shift reaction was measured. Also, the temperature in the interior of the normal-pressure fixed-bed flow reaction pipe was changed, and the performance test was repeated. The reformed gas was identical to the reformed gas supplied to the shift converter 6 in the hydrogen generator 50. In this test, the reformed gas containing 10% of CO in a dry gas base % and humidified with a S/C ratio of 3 was used.

As can be seen from FIG. 2, the CO concentration $X_n$ increases with an increase in the number of times n. In other words, the catalytic activity degrades with an increase in the number of times n. Especially when the temperature in the interior of the normal-pressure fixed-bed flow reaction pipe, i.e., the temperature of the shift reaction was set lower, the catalytic activity significantly degraded. In a case where start-up and stop of the hydrogen generator 50 were repeated, if the temperature of the shift reaction, i.e., the detected inlet temperature TA and the detected outlet temperature TB were set lower, the CO concentration in the reformed gas after the shift reaction significantly increased, i.e., the catalytic activity significantly degraded, while when the temperature of the shift reaction was set higher, the catalytic activity slightly degraded. In this performance test, during a reaction stop period, the shift reaction catalyst body 6A was cooled to a state in which water condensation occurred, i.e., to a temperature lower than 100° C.

Based on this, the hydrogen generator 50 is operated assuming that the number of times n of the shift reaction is the number of times n of the shift converter 6 or the hydrogen generator 50. That is, the reaction temperature of the shift reaction catalyst body 6A of the shift converter 6 is adjusted to increase with an increase in the number of times n. For example, a controlled temperature $T_n$ of the shift reaction is raised by 10° C. for an increase of 500 in the number of times n. This makes it possible to maintain an ability to supply a reformed gas containing less CO for a long time period while dealing with degradation of the catalytic activity of the shift reaction body 6A with a reliable and simple method. More desirably, by pre-analyzing the relationship between the number of times n and the CO concentration $X_n$ of the reformed gas after the shift reaction from a performance test result illustrated in FIG. 2, more correct temperature control during the reaction of the shift reaction catalyst body 6A is able to be achieved. Since the increase in the controlled temperature $T_n$ is able to be adjusted more correctly in this manner, the CO concentration of the reformed gas after the shift reaction is able to be kept lower. Here, with reference to FIG. 2, temperature (controlled temperature $T_n$) at which the CO concentration $X_n$ was the lowest, in the predetermined number of times n, is decided. Since the performance test results are indicated by envelope curves as shown in FIG. 2, it is difficult to immediately detect the controlled temperature $T_n$ from the performance test results. If the controlled temperature $T_n$ is decided to be a lower, then water condensation is more likely to occur during the reaction stop state. Accordingly, a temperature range in which the CO concentration $X_n$ is the lowest is found from the performance test result, and the controlled temperature $T_n$ is decided to be a higher value in that temperature range. Thus, optimal controlled temperature $T_n$ is decided so as to correspond to the predetermined number of times n, and the controlled temperature $T_n$ corresponding to the number of times n is created into a data base as controlled temperature data. The data base ("n–Tn data base") is utilized for control of the operation of the hydrogen generator 50.

Herein, the n–Tn data base is created such that $T1=180°$ C. corresponds to n=1, $T500=190°$ C. corresponds to n=500, $T1000=200°$ C. corresponds to n=1000, and $T_n$ 2000=210° C. corresponds to n=2000.

Thereby, the shift reaction temperature of the shift converter 6 is controlled more efficiently according to an increase in the number of times n.

As shown in FIG. 2, by shifting the controlled temperature $T_n$ to be higher, the CO concentration of the reformed gas after the shift reaction changes because of a temperature balance condition of the shift reaction. Also, by adjusting the amount of oxidizing agent supplied (in this embodiment air supplied from the air supply device 9A), the CO selective oxidation is promoted in the CO selective oxidation device 10, thereby decreasing the CO concentration of the reformed gas in the reformed gas passage 8C.

The hydrogen generator 50 adjusts a supplied air flow rate Q, i.e., a flow rate of the air supplied from the air supply device 9A based on the controlled temperature $T_n$ and the reformed gas flow rate Q in a way as described below.

First, based on the number of times n and controlled temperature $T_n$ specified in the n–Tn data base, the CO concentration $X_n$ of the reformed gas after the shift reaction, i.e., the reformed gas in the reformed gas passage 8C is estimated, with reference to the performance test results of the shift reaction catalyst body 6A illustrated in FIG. 2.

As the flow rate of the reformed gas, a reformed gas flow rate P, i.e., a flow rate of the reformed gas to be supplied to the CO selective oxidation device 10 may be detected by, for example, a known flow rate meter (not shown) attached on the reformed gas passage 8B. Herein, the reformed gas flow rate P of the reformed gas in the reformed gas passage 8b is calculated based on controlled supply amounts of the material feed device 2A and the water supply device 3A, a chemical reaction formula of the reforming reaction, and the controlled temperature Tn.

From the estimated CO concentration Xn and the reformed gas flow rate P, an amount of oxygen required to completely oxidize the CO per the reformed gas flow rate is calculated according to an oxidation reaction formula of CO and oxygen. A required oxidizing flow rate (air flow rate) is calculated from a required oxygen amount. The required oxidizing agent flow rate may be a controlled air flow rate Qn. Nonetheless, more desirably, the controlled air flow rate Qn is set to supply oxygen (atom) in amount that is several times as much as the required oxygen amount, considering unbalance of a concentration between CO and oxygen in the reformed gas. Herein, the controlled air flow rate Qn is assumed to be an air flow rate for allowing supply of oxygen in amount that is four times as much as the required oxygen amount.

The supplied air flow rate Q of the air supplied from the air supply device 9A is adjusted to be the controlled air flow rate Qn.

By such adjustment, the CO selective oxidation in the CO oxidation device 10 is promoted, thereby reducing the CO concentration of the reformed gas in the reformed gas passage 8C. Herein, the CO concentration Xn corresponding to the controlled temperature Tn is created into a data base as CO concentration data so as to be associated with the controlled temperature Tn. The data base ("Tn–Xn data base") is utilized to control the operation of the hydrogen generator 50.

Figure 3:
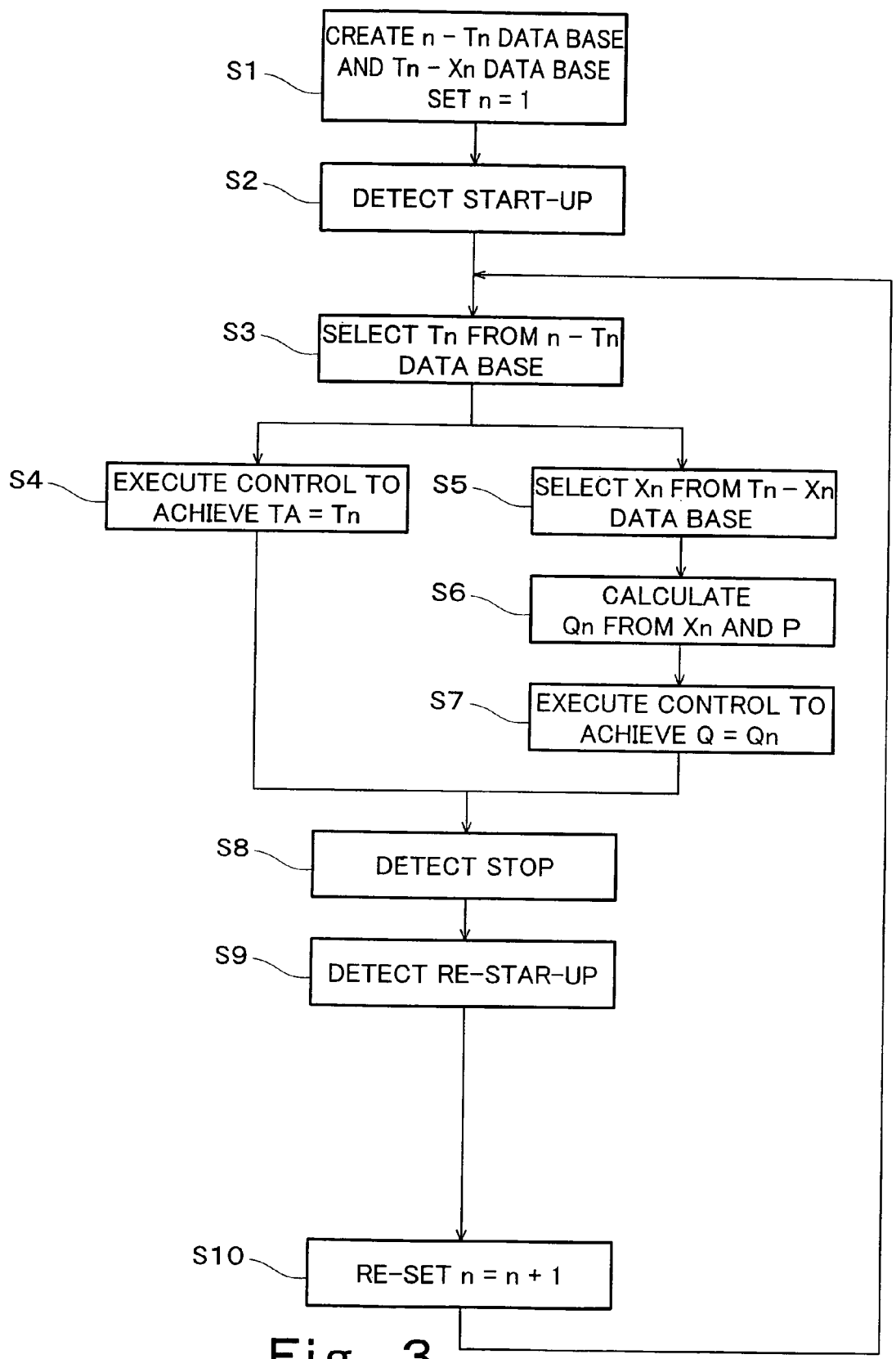
FIG. 3 is a flowchart showing an operation of a hydrogen generation system of FIG. 1.

FIG. 3 is a flowchart showing an example of an operation of the hydrogen generator of FIG. 1.

In step S1, the controller 12 creates the n–Tn data base and the Tn–Xn data base (hereinafter referred to as two data bases). In addition, the number of times n is set to n=1. The two data bases are created by utilizing performance test results using the shift reaction catalyst body 6A. The two data bases are stored in the controller 12. In addition, the number of times n=1 is stored in the controller 12. The controller 12 includes a built-in microchip containing n=1 and the two data bases. Or, the controller 12 may have a input portion to which the number of times n=1 is input, and the predetermined number of times n, the controlled temperature Tn corresponding to the predetermined number of times n, and the CO concentration Xn corresponding to the controlled temperature Tn are input, and may create the two data bases using these data and store them.

In step S2, the controller 12 detects start-up of the shift converter 6. In this case, the controller 12 of the hydrogen generator 50 may detect start-up of the shift converter 6 by detecting a temperature change at the detected inlet temperature TA, i.e., a temperature increase. With such a configuration, the start of the shift reaction is directly detected, and thus, the hydrogen generator 50 is made more reliable. The controller 12 may alternatively detect start-up of the hydrogen generator 50 by detecting a start-up signal from a start-up switch of the hydrogen generator 50, or a start-up signal from the fuel cell, an industrial plant, and so on, operating in association with the hydrogen generator 50. This simplifies a control configuration of the controller 12.

In step S3, the controller 12 selects the controlled temperature Tn from the n–Tn data base.

In step S4, the controller 12 controls the hydrogen generator 50 so that the detected inlet temperature TA is TA=Tn. Herein, the controller 12 controls a cooling ability of the reformed gas cooler 5.

In step S5, the controller 12 selects a CO concentration Xn corresponding to the controlled temperature Tn from the Tn–Xn data base.

In step S6, the controller 12 calculates the controlled air flow rate Qn from the selected CO concentration Xn and the reformed gas flow rate P.

In step S7, the controller 12 controls the hydrogen generator 50 so that the supplied air flow rate Q is Q=Qn. Here, the controller 12 controls a supply ability of the air supply device 9A.

In step S8, the controller 12 detects stop of the shift converter 6 by detecting a temperature decrease in the detected inlet temperature TA, i.e., temperature decrease continuing after the stop of the reformed gas cooler 5. In such a configuration, since the stop of the shift reaction is directly detected, the hydrogen generator 50 becomes more reliable. Alternatively, the controller 12 may detect the stop of the hydrogen generator 50, by detecting a stop signal from a stop switch of the hydrogen generator 50 or a stop signal from a fuel cell, an industrial plant, and so on, operating in association with the hydrogen generator 50. This simplifies a control configuration of the controller 12.

In step S9, the controller 12 detects re-start-up of the shift converter 6 as in step S2.

In step S10, the controller 12 re-sets the number of times n to n=n+1. Then, the controller 12 advances a process to step S3, and repeats the above-mentioned steps.

By the above mentioned operation, the hydrogen generator 50 is able to continue generating the reformed gas with a low CO concentration for a long time period while dealing with activity degradation of the shift reaction catalyst body 6A.

If the shift reaction catalyst body 6A is changed to a new one, the number of times n is re-set to n=1.

In accordance with the above mentioned embodiment, since the shift reaction temperature is increased based on the number of times of start-up and/or stop of the hydrogen generator 50, i.e., the number of times n of start and/or stop of the shift reaction, the hydrogen generator 50 is able to maintain an ability to supply the reformed gas containing less CO for a long time period while dealing with degradation of the catalytic activity of the shift reaction with a reliable and simple method. In addition, in this embodiment, since the CO selective oxidation is able to be carried out while predicting the CO concentration of the reformed gas after the shift reaction, which corresponds to the controlled temperature Tn, the CO concentration of the reformed gas is able to be further reduced.

While in this embodiment, the controller 12 counts the number of times n at the start-up of the shift converter 6 in steps S2 and S9, it may alternatively detect the stop of the shift converter 6 in step S9. In this case, the controller 12 of the hydrogen generator 50 may detect the stop of the shift converter 6 by detecting a temperature change, i.e., a temperature decrease, in the detected inlet temperature TA. The controller 12 may alternatively detect stop of the hydrogen generator 50 by detecting a stop signal from the stop switch of the hydrogen generator 50, or a stop signal from the fuel cell, an industrial plant, and so on, operating in association with the hydrogen generator 50.

Alternative Example 1

In an alternative example 1, a counting condition of the number of times n in the operations at stop and re-start-up of the hydrogen generator 50 is added. Since only the operations at stop and at re-start-up of the hydrogen generator 50 are different, the construction and the like of the hydrogen generator 50 will not be further described.

First, a background of a conception of the alternative example 1 of the present invention will be described.

The inventors analyzed the above mentioned performance test result of the shift reaction catalyst body more carefully, and found that degradation of catalytic activity that occurs with the number of times of start and/or stop of the shift reaction was able to be reduced by inhibiting water condensation on the shift reaction catalyst body 6A during the stop state of the shift reaction. Since the shift converter 6 consumes a large amount of catalyst of the shift reaction catalyst body 6A and has a large heat capacity, a time is required to warm up structures in the interior of the shift converter 6 at the re-start of the shift reaction of the shift converter 6. For this reason, steam in the reformed gas may be condensed in the interior of the shift converter 6 to generate water on the shift reaction catalyst body 6A. If the shift reaction catalyst body 6A gets wet, the catalyst tends to be oxidized or otherwise a mutual action between catalytic particles and a carrier carrying the catalytic particles tends to become weak, causing the catalytic activity to be degraded. Because the temperature in the interior of the shift converter 6 becomes lower during the stop state when the temperature during the reaction of the shift catalyst reaction body 6A is lower, water condensation on the shift reaction catalyst body 6A becomes more significant. The inventor assumed that water condensation on the shift reaction catalyst body 6A is a cause of an event that the catalytic activity tends to degrade more significantly when the temperature of the shift reaction catalyst body 6A is set lower as illustrated in FIG. 2, and verified this.

Figure 4:
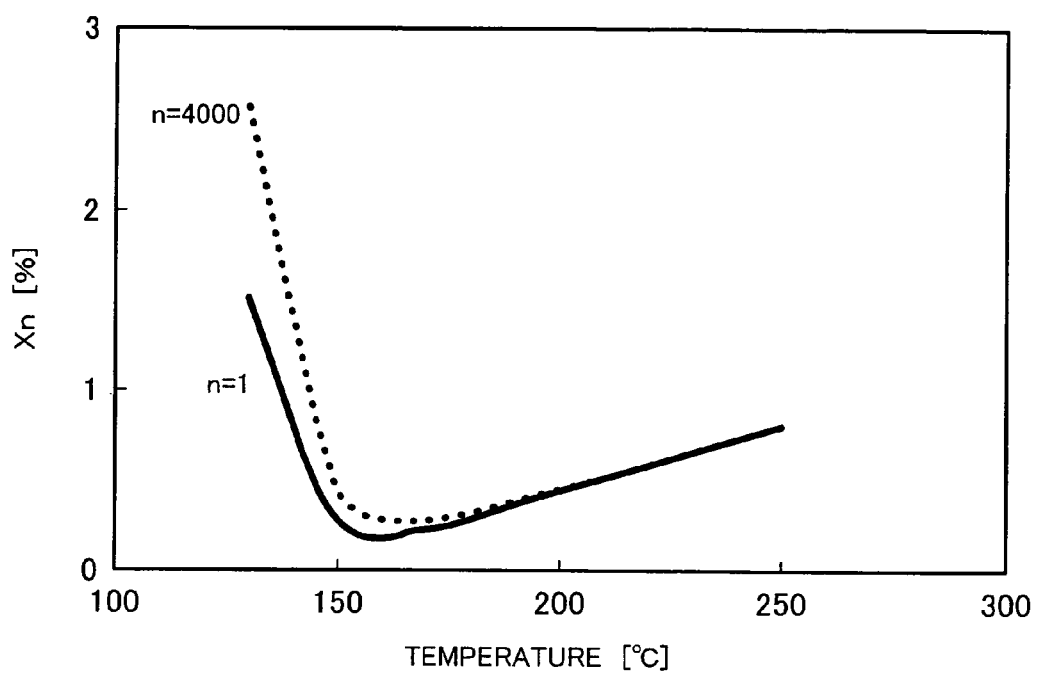
FIG. 4 is a view showing a relationship between the number of times of start and/or stop of the shift reaction and the CO concentration after the shift reaction in a case where the performance test of FIG. 2 is conducted while keeping a temperature of a normal-pressure fixed-bed flow reaction pipe so as not to cause water condensation in a stop state of the shift reaction.

FIG. 4 is a view showing a relationship between the number of times of start and/or stop of the shift reaction and the CO concentration after the shift reaction in a case where the performance test of FIG. 2 is conducted while keeping a temperature of a normal-pressure fixed-bed flow reaction pipe so as not to cause water condensation during the stop state of the shift reaction.

As can be seen from comparison between FIGS. 2 and 4, it is verified that degradation of the catalytic activity is less in FIG. 4 than in FIG. 2 when the number of times n is n=4000.

Based on this, the hydrogen generator 50 counts the number of times n of the shift converter 6 or the hydrogen generator 50 according to a stop state of the shift converter 6, in particular a heat radiation state of the shift converter 6. In this case, the hydrogen generator 50 detects the heat radiation state in the interior of the shift converter 6 during the stop state by utilizing the detected inlet temperature TA and the detected outlet temperature TB. At the re-start-up, the hydrogen generator 50 counts the number of times n only when it is determined that the temperature has been lowered to a value at which water condensation occurs on the shift reaction catalyst body 6A. This makes it possible to suppress an unnecessary increase in the controlled temperature Tn. As a result, the CO concentration of the reformed gas after the shift reaction can be kept lower.

Whether or not water condensation has occurred on the shift reaction catalyst body 6A is determined by directly or indirectly detecting the temperature of the shift reaction catalyst body 6A. Here, the detected inlet temperature TA and the detected outlet temperature TB are compared to the number determination temperature TC which is pre-set.

Figure 5:
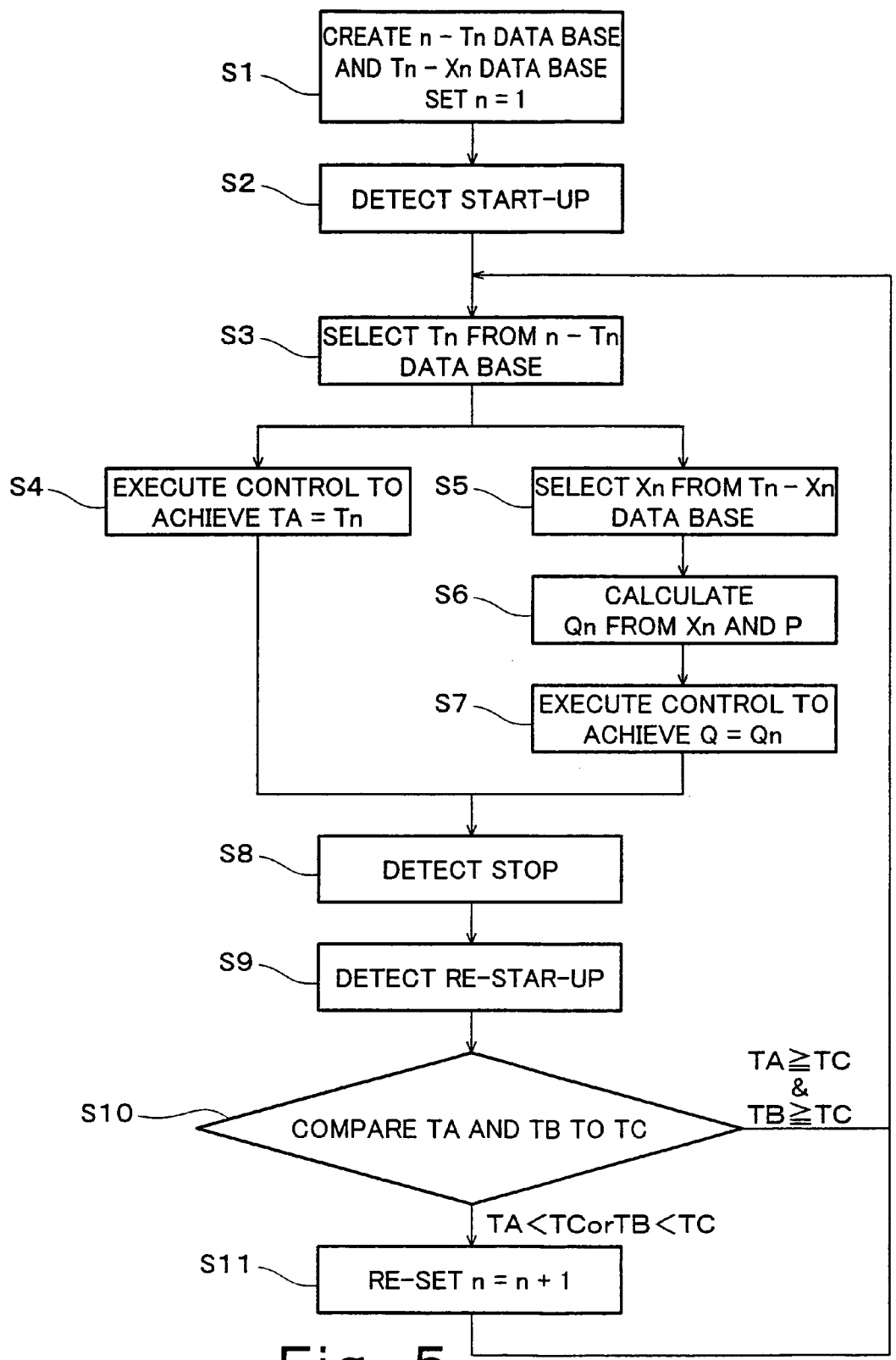
FIG. 5 is a flowchart showing an example of an operation of a hydrogen generation system according to an alternative example 1.

FIG. 5 is a flowchart showing an example of an operation of the hydrogen generator of the alternative example 1.

In FIG. 5, step S1 through step S9 are identical to those of the flowchart of FIG. 3.

In step S10, the controller 12 compares the detected inlet temperature TA and the detected outlet temperature TB to the number determination temperature TC. If it is determined that at least one of the detected inlet temperature TA and the detected outlet temperature TB is lower than the number determination temperature TC, the controller 12 advances the process to step S11 and re-sets the number of times n to n=n+1. Then, the controller 12 advances the process to step S3 and repeats the above mentioned steps. On the other hand, if it is determined that both the detected inlet temperature TA and the detected outlet temperature TB are not lower than the number determination temperature TC in step S9, the controller 12 advances the process to step S3 and repeats the above mentioned steps without counting up the number of times n.

Here, the number determination temperature TC is TC=100° C.

As described above, in accordance with this alternative example, the temperature of the shift reaction is increased based on a possibility of the water condensation on the shift reaction catalyst body 6a in the interior of the shift converter 6 in addition to the number of times of start-up and/or stop of the hydrogen generator 50, i.e., the number of times n of start and/or stop of the shift reaction. Therefore, an unnecessary temperature increase or S/C ratio increase is able to be suppressed. As a result, the hydrogen generator 50 is able to maintain an ability to supply the reformed gas containing less CO for a long time period while suitably dealing with degradation of the catalytic activity of the shift reaction by a reliable and simple method.

The number determination temperature TC is able to be set more accurately. To be specific, a performance test of the shift reaction catalyst body using the temperature during the stop state of the shift reaction as a parameter is conducted and results of a degraded state of the catalytic activity are created into a data base. Then, the detected inlet temperature TA and the detected outlet temperature TB during the stop state of the shift converter 6 are compared to the data base to determine whether or not to count up the number of times n. For example, since the reformed gas controlled to have a predetermined dew point is typically supplied to the shift converter 6 in a case where the hydrogen generator 50 is used in a fuel cell system, the dew point of the reformed gas supplied may be used as the number determination temperature TC.

Embodiment 2

In an embodiment 2, an accumulated operation time h is added to a setting condition of the controlled temperature Tn of the embodiment 1. Since the embodiment 2 is identical to the embodiment 1 except a n–Tn data map, the construction or the like of the hydrogen generator 50 will not be further described, and only a difference will be described.

First, a background of a conception of the embodiment 2 of the present invention will be described.

The inventors found that the catalytic activity of the shift reaction catalyst body 6A degrades depending on an accumulated operation time of the shift reaction. Below, a relationship between the accumulated operation time of the shift reaction and the CO concentration of the reformed gas after the shift reaction will be described.

Figure 6:
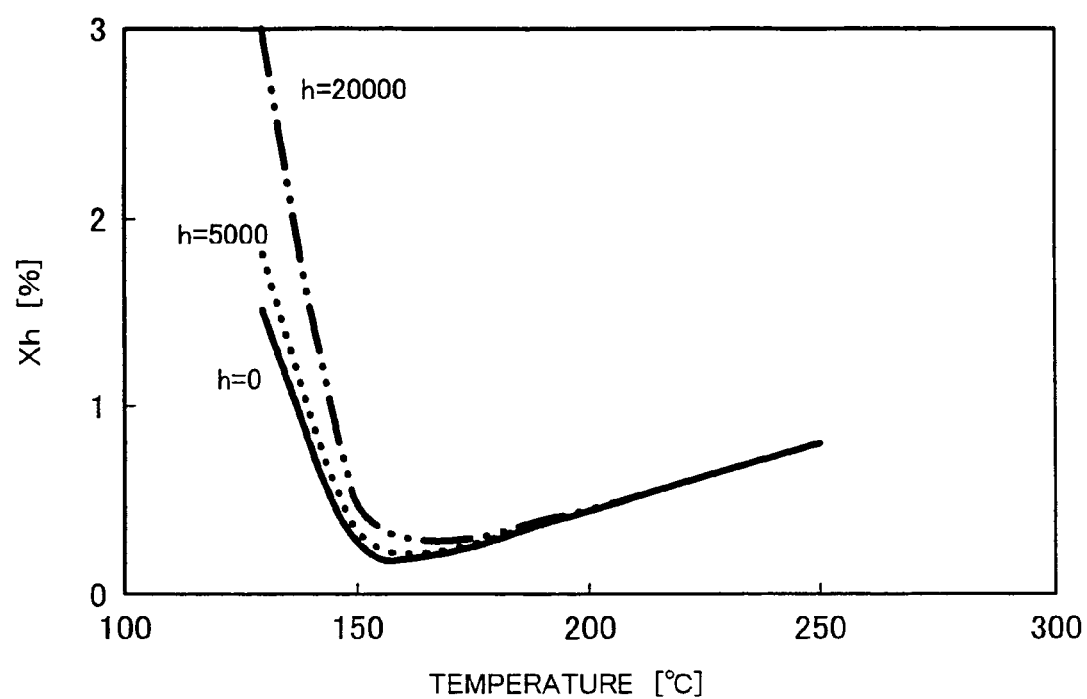
FIG. 6 is a view showing a relationship between a reaction time of the shift reaction and the CO concentration of the reformed gas after the shift reaction in the performance test using the shift reaction catalyst body of FIG. 1.

FIG. 6 is a view showing a relationship between a reaction time of the shift reaction and the CO concentration of the reformed gas after the shift reaction in the performance test using the shift reaction catalyst body of FIG. 1. The reaction time corresponds to the accumulated operation time h of the hydrogen generator, and therefore is expressed as a reaction time h for the sake of convenience. In FIG. 6, a CO concentration Xh of a reformed gas after the shift reaction is indicated by an envelope curve for each predetermined reaction time h. This performance test was conducted in such a manner that the shift reaction catalyst body 6A was installed in the normal-pressure fixed-bed flow reaction pipe and the reformed gas containing CO and the steam was flowed therein. The shift reaction was continued while keeping the temperature in the interior of the normal-pressure fixed-bed flow reaction pipe constant. After the predetermined reaction time h (0 h, 5000 h, and 20000 h), the CO concentration Xh of the reformed gas after the shift reaction was measured. Also, the temperature in the interior of the normal-pressure fixed-bed flow reaction pipe was changed, and the performance test was repeated. As the reformed gas, a reformed gas identical to that used in the performance test in the embodiment 1 was used.

As can be seen from FIG. 6, the CO concentration Xh increases with an increase in the reaction time h. In other words, the catalytic activity degrades with an increase in the reaction time h. Especially when the temperature in the interior of the normal-pressure fixed-bed flow reaction pipe, i.e., the temperature of the shift reaction temperature was set lower, the catalytic activity degrades more significantly. When the temperature of the shift reaction, i.e., the detected inlet temperature TA and the detected outlet temperature TB were set lower in a case where the hydrogen generator 50 was operated for a long time period, the CO concentration in the reformed gas after the shift reaction significantly increased, i.e., the catalytic activity significantly degraded, while when the temperature of the shift reaction was set higher, the catalytic activity slightly degraded.

Based on this, the hydrogen generator 50 is operated assuming that the reaction time h of the shift reaction is the accumulated operation time h of the shift converter 6 or the hydrogen generator 50. That is, the reaction temperature of the shift reaction catalyst body 6A of the shift converter 6 is adjusted to be higher as the accumulated operation time h increases.

To be specific, the hydrogen generator 50 is operated so as to increase the controlled temperature Tnh of the shift reaction while performing determination as to the degradation conditions of the catalytic activity of the number of times n and the accumulated operation time h. As in the embodiment 1, optimal controlled temperature Tnh according to the number of times n and the accumulated operation time h is decided by utilizing the performance test results illustrated in FIGS. 2 and 6, and the controlled temperature Tnh corresponding to the number of times n and the accumulated operation time h are created into a data base as controlled temperature data to be associated with the number of times n and the accumulated operation time h. The data base is utilized to control the operation of the hydrogen generator 50.

The controlled temperature Tnh corresponding to the number of times n and the accumulated operation time h are created into the data base in such a manner that the controlled temperature Tnh is stored to be associated with the number of times n and the accumulated operation time h. For example, one of the number of times n and the accumulated operation time h is used as the parameter and a relationship between the other and the controlled temperature Tnh is stored in the form of a table, a graph, etc. Or, the controlled temperature Tnh is stored as an area expressed on a two-dimensional plane defined by two axes which are perpendicular to each other and respectively correspond to the number of times n and the accumulated operation time h. Or, the controlled temperature Tnh is stored as a function of the number of times n and the accumulated operation time h. Here, a matrix ("n-h-Tnh" data map) of the controlled temperature Tnh is created using the number of times n and the accumulated operation time h as parameters. FIG. 7 is a view showing a n-h-Tnh data map of the embodiment 2. As shown in FIG. 7, the controlled temperature Tnh is set 10° C. higher when the accumulated operation time h exceeds 20000 h. Notably, it is determined from FIGS. 2 and 6 that no effects are expected if the controlled temperature Tnh is set to 210° C. or higher and therefore is set to 210° C. irrespective of the accumulated operation time h when the number of times n is 2000 or more.

In this embodiment, as in the Tn-Xn data base of the embodiment 1, the CO concentration Xnh corresponding to the controlled temperature Tnh is created into a data base as CO concentration data to be associated with the controlled temperature Tnh. The data base ("Tnh-Xnh data base") is utilized to control the operation of the hydrogen generator 50. The Tnh-Xnh data base is desirably decided as in the embodiment 1 by utilizing results of the performance test of the shift reaction catalyst body 6A for each conditions of the number of times n and the accumulated operation time h. Nonetheless, because the performance test requires time, the condition setting tends to vary. Comparing FIGS. 2 and 6, the catalytic activity degrades more significantly in FIG. 2 than in FIG. 6. Accordingly, by utilizing the performance test results based on the number of times n illustrated in FIG. 2, the CO concentration Xnh is decided as CO concentration Xn=Xnh by assuming that the controlled temperature Tn is Tn=Tnh, for convenience. Since the performance test of the shift reaction catalyst body 6A is omitted, time and cost necessary to set the CO concentration Xnh can be reduced.

Figure 8:
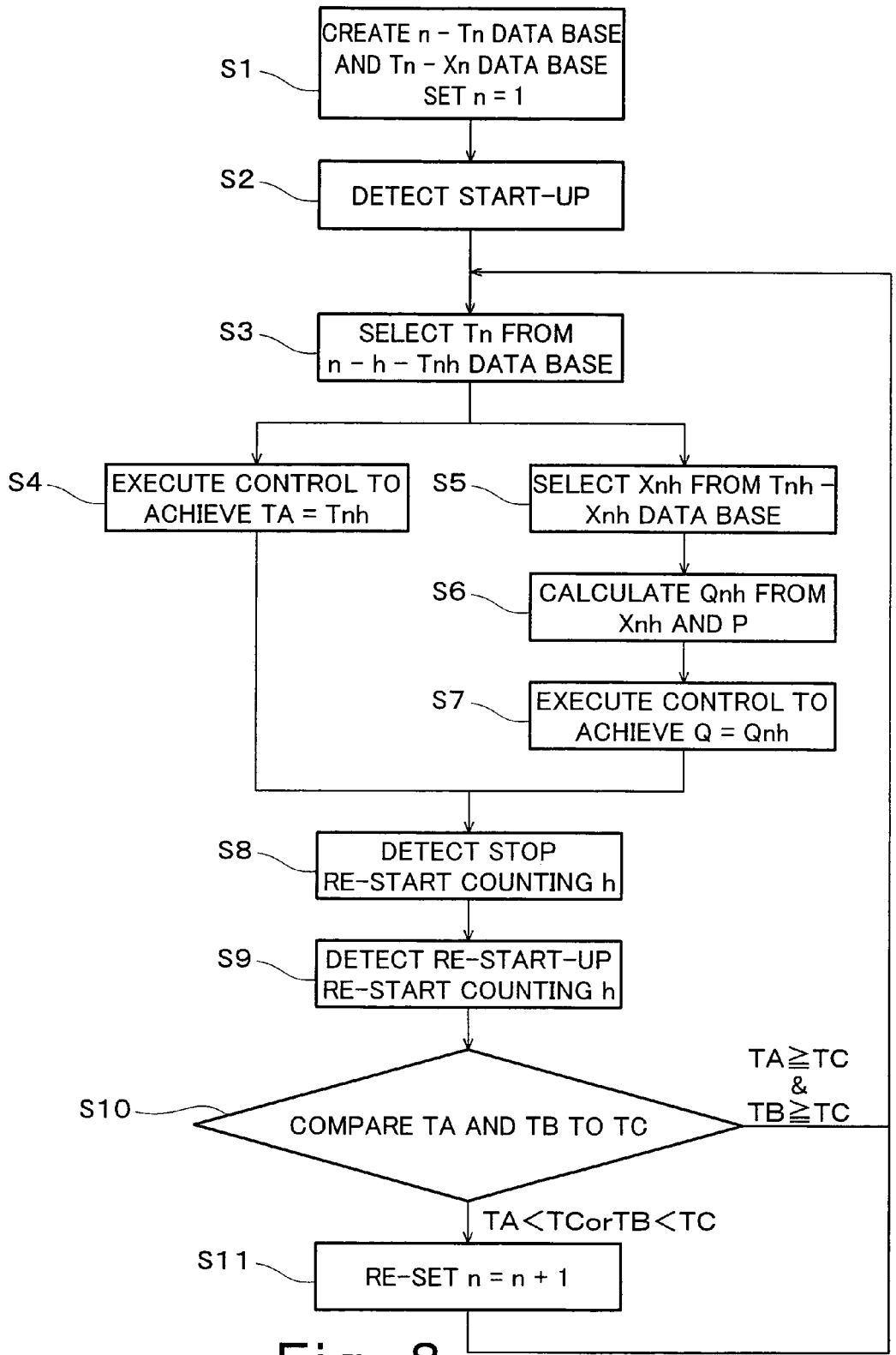
FIG. 8 is a flowchart showing an example of an operation of a hydrogen generator according to an embodiment 2 of the present invention.

FIG. 8 is a flowchart showing an example of an operation of the hydrogen generator of the embodiment 2. The whole operation of FIG. 8 is identical to that of FIG. 5, and will be described by referring to description in connection with FIGS. 3 and 5.

In step 1, the controller 12 creates the n-h-Tnh data map and the Tnh-Xnh data base (hereinafter referred to as two data bases). In addition, the controller 12 sets the number of times n to n=1 and sets the accumulated operation time h to h=0. These two data bases are created by utilizing the performance test results using the shift reaction catalyst body 6A, and are stored in the controller 12. The number of times n=1 and the accumulated operation time h=0 are stored in the controller 12. The controller 12 includes a built-in microchip containing the number of times n=1, the accumulated operation time h=0, and the two data bases. Alternatively, the controller 12 may have an input portion to which the number of times n=1 and the accumulated operation time h=0 are input, the predetermined number of times n and the predetermined accumulated operation time h, the controlled temperature Tnh corresponding to the number of times n and the accumulated operation time h, and the CO concentration Xnh corresponding to Tnh are input, and may create the two data bases using these data and store them therein.

Step S2 is identical to that of FIG. 3, except that the controller 12 starts counting the accumulated operation h upon detection of the start-up.

In step S3, the controller 12 selects Tnh from the n-h-Tn data base.

In step S4, the controller 12 controls the hydrogen generator 50 so that the detected inlet temperature TA is TA=Tnh. In this case, the controller 12 controls a cooling ability of the reformed gas cooler 5.

In step S5, the controller 12 selects Xnh from the Tnh–Xnh data base.

In step S6, the controller 12 calculates the controlled air flow rate Qnh from the selected CO concentration Xnh and the reformed gas flow rate P.

In step S7, the controller 12 controls the hydrogen generator 50 so that the supplied air flow rate Q is Q=Qnh. In this case, the controller 12 controls a supply ability of the air supply device 9A. Steps S8 and 9 are identical to those of FIG. 3, except that the controller 12 stops and re-starts counting the accumulated operation time h.

Steps S10 and S11 are identical to those of FIG. 5.

From the above-mentioned operation, the inventors found that the hydrogen generator 50 was able to generate a reformed gas with a CO concentration of less than 100 ppm after the number of times n of 2000 and the accumulated operation time h exceeding 10000 h.

If the shift reaction catalyst body 6A is changed to a new one, the number of times n is re-set to n=1.

Thus, in this embodiment, the temperature of the shift reaction is increased based on the accumulated operation time h of the hydrogen generator 50 in addition to the number of times of start-up and/or stop of the hydrogen generator 50, i.e., the number of times n of start and/or stop of the shift reaction. As a result, the hydrogen generator 50 is able to maintain an ability to supply the reformed gas containing less CO for a long time period while suitably dealing with degradation of the catalytic activity of the shift reaction by a reliable and simple method.

Embodiment 3

A hydrogen generator according to an embodiment 3 of the present invention has a configuration similar to that of the embodiment 2 except that the hydrogen generator 50 is configured to control a S/C ratio of the reformed gas. To be specific, a moisture in the reformed gas, i.e., the S/C ratio of the reformed gas is increased according to an increase in the number of times n and the accumulated operation time h of the shift converter 6, thereby enabling the shift reaction to promote (see patent document 1).

In this embodiment, the controller 12 is configured to control a ratio between the supplied water flow rate of water supplied from the water supply device 3A and the amount of the material fed from the material feed device 2A based on the number of times n of the shift converter 6 and the accumulated operation time h. For example, the controller 12 increases the supplied water flow rate of the water supplied from the water supply device 3A and decreases the amount of material fed from the material feed device 2A so as not to substantially vary the reformed gas flow rate of the reformed gas to be generated. The controller 12 controls the reformed gas flow rate while keeping the ratio between the supplied water flow rate of the water supplied from the water supply device 3A and the amount of the material fed from the material feed device 2A.

A specific controlled value of the S/C ratio of the reformed gas, i.e., the controlled S/C ratio is decided as in the embodiment 1 and the embodiment 2. To be specific, by utilizing the performance test of the shift reaction catalyst body 6A, the controlled S/C ratio corresponding to the number of times n is created into a data base as the controlled S/C ratio data so as to be associated with the number of times n. Or, the controlled S/C ratio corresponding to the number of times n and the accumulated operation time h is created into a data base as the controlled S/C ratio data so as to be associated with the number of times n and the accumulated operation time h. The data base is utilized for the operation for the hydrogen generator 50.

The controlled S/C ratio corresponding to the number of times n and the accumulated operation time h is created into the data base as in the embodiment 2 in such a manner that the controlled S/C ratio is stored to be associated with the number of times n and the accumulated operation time h.

Also, the CO concentration Xn is estimated as in the embodiment 1. To be specific, by utilizing the performance test of the shift reaction catalyst body 6A, the CO concentration Xn corresponding to the controlled S/C ratio is created into the data base as the CO concentration data so as to be associated with the S/C ratio, and the data base is utilized for the operation of the hydrogen generator 50.

Thus, in this embodiment, the S/C ratio of the reformed gas is increased based on the number of times of the start-up and/or stop of the hydrogen generator 50, i.e., the number of times n of start and/or stop of the shift reaction. As a result, the hydrogen generator 50 is able to maintain an ability to supply the reformed gas containing less CO for a long time period while dealing with degradation of the catalytic activity of the shift reaction by a reliable and simple method. In addition, in this embodiment, since the CO selective oxidation is able to be carried out while predicting the CO concentration of the reformed gas after the shift reaction corresponding to the controlled S/C ratio, the CO concentration of the reformed gas can be reduced. Further, in this embodiment, the S/C ratio of the reformed gas is increased based on the accumulated operation time h of the hydrogen generator 50 in addition to the number of times of the start-up and/or stop of the hydrogen generator 50, i.e., the number of times n of start and/or stop of the shift reaction. As a result, the hydrogen generator 50 is able to maintain an ability to supply the reformed gas containing less CO for a long time period while suitably dealing with degradation of the catalytic activity of the shift reaction by a reliable and simple method.

Embodiment 4

Figure 9:
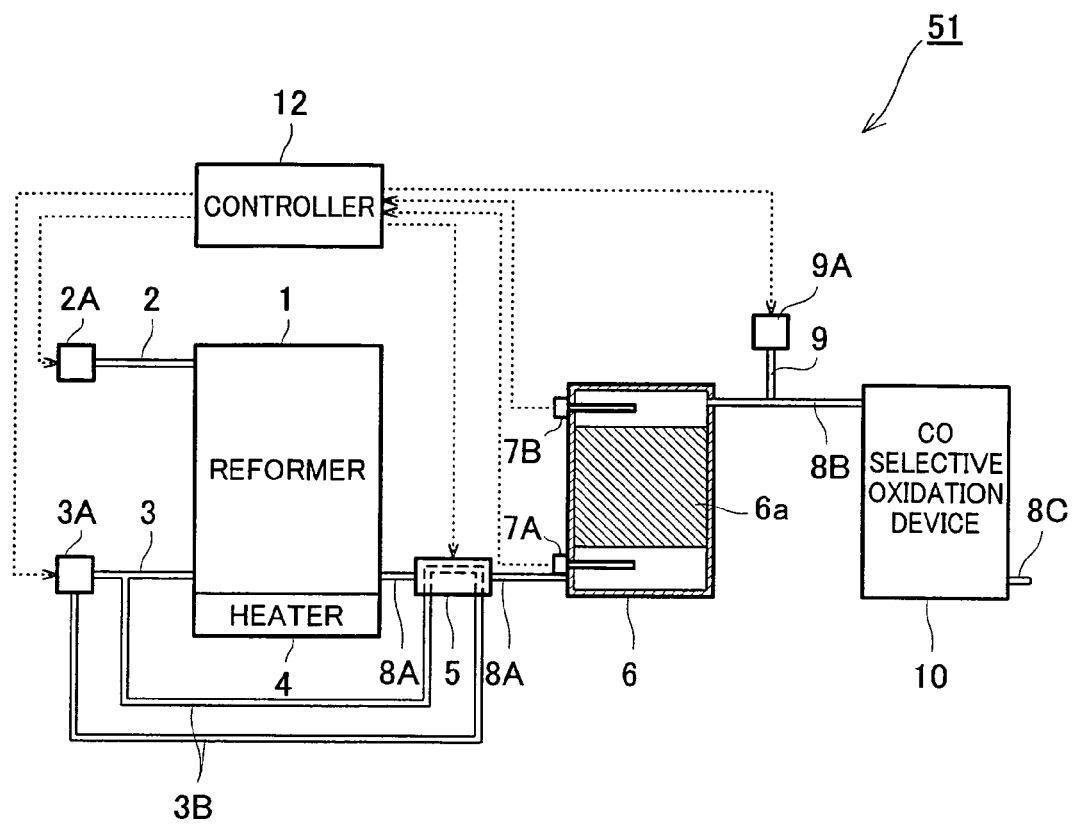
FIG. 9 is a view schematically showing a construction of a hydrogen generator according to an embodiment 4 of the present invention.

FIG. 9 is a view schematically showing a construction of a hydrogen generator according to an embodiment 4 of the present invention.

A hydrogen generator of the embodiment 4 differs in a structure of the reformed gas cooler 5 from the hydrogen generator 50 of the embodiment 1. To be specific, a hydrogen generator 51 of the embodiment 4 is equipped with a shift reaction controller 5 configured to cool the reformed gas flowing in the reformed gas passage 8A by the water supplied from the water supply device 3A. The configuration and operation of the hydrogen generator 51 are identical to those of the embodiment 1 except the structure of the reformed gas cooler 5, and will not be further described, and a difference will be described.

The hydrogen generator 51 is provided with a bypass water passage 3B. The bypass water passage 3B connects the water supply device 3A and the reformed gas cooler 5 to each other, extends through the reformed gas cooler 5, and connects the reformed gas cooler 5 and the water passage 3 to each other.

The reformed gas cooler 5 is configured to allow the water in the bypass water passage 3B to flow around the reformed gas passage 8A. The reformed gas cooler 5 is able to control a degree to which the reformed gas flowing in the reformed gas passage 8A is cooled, by controlling the flow rate of the water in the bypass water passage 3B.

The water which is heated by heat exchange with the reformed gas flowing in the reformed gas passage 8A flows into the water passage 3 and is supplied to the reformer 1. Since the temperature-increased water is supplied to the reformer 1 increases, an energy to evaporate the water in the reformer 1 can be reduced, i.e., an energy to be supplied to the heater 4 can be lessened. As a result, energy efficiency of the hydrogen generator can be increased.

Embodiment 5

Figure 10:
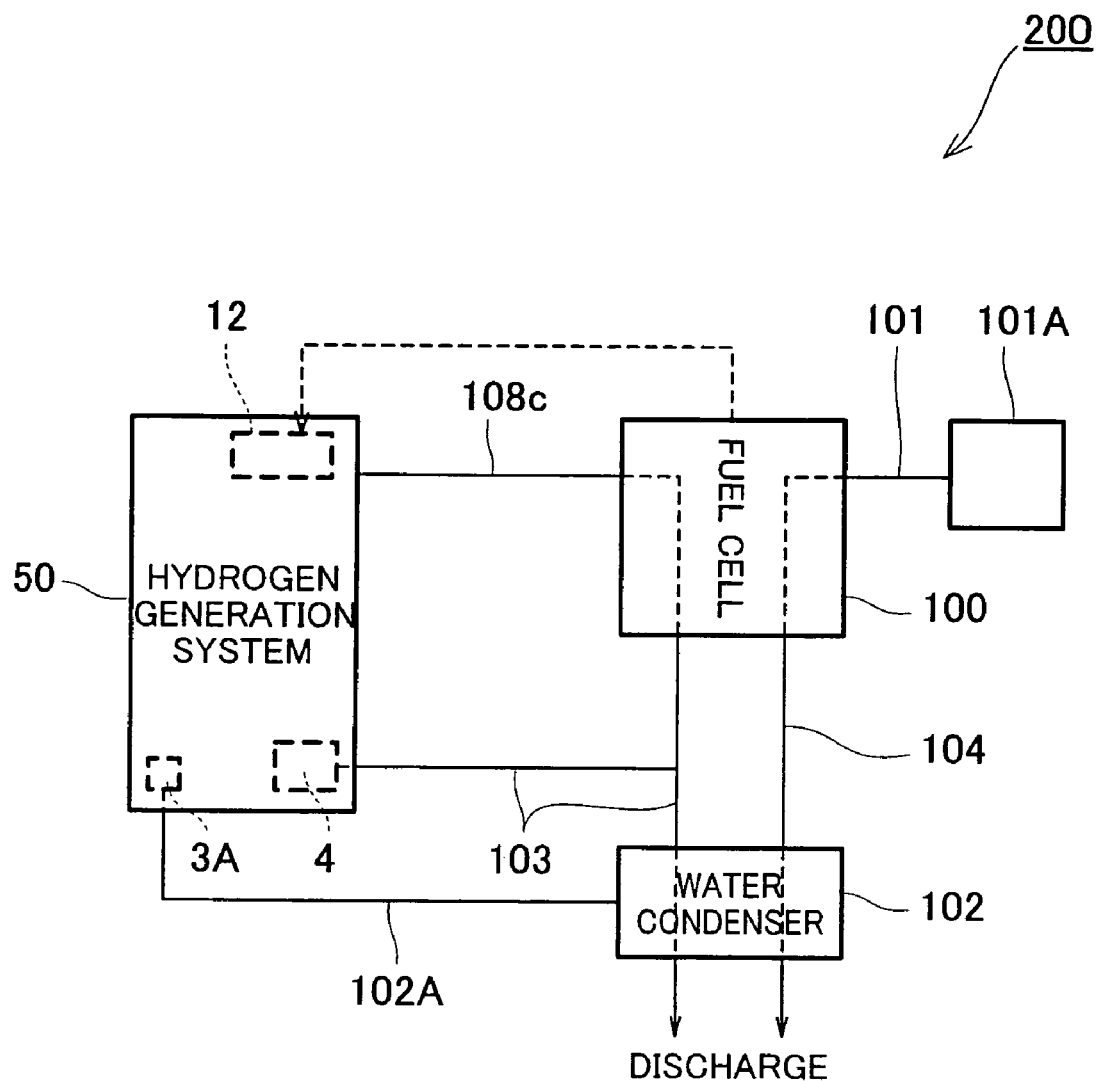
FIG. 10 is a view schematically showing a construction of a fuel cell system according to an embodiment 5 of the present invention.

FIG. 10 is a view schematically showing a fuel cell system of an embodiment 5 of the present invention.

A fuel cell system 200 of the embodiment 5 includes the hydrogen generator 50 of the embodiment 1 and a fuel cell 100. The fuel cell system 200 is configured in such a manner that the reformed gas generated in the hydrogen generator 50 is supplied to the fuel cell 100 through the reformed gas passage 8C. Air is supplied from the air supply device 101A to the polymer electrolyte fuel cell 100 through an air passage 101. As the air supply device 101A, a known blower is used.

An off gas exhausted from the fuel cell 100 flows in an off gas passage 103, and air exhausted from the fuel cell 100 flows in an exhaust air passage 104.

The off gas passage 103 and the exhaust air passage 104 extend through a water condenser 102.

The water condenser 102 condenses water, which is supplied, through a condensed water passage 102A, to the hydrogen generator 50, precisely, to the water supply device 3A (not illustrated in detail). This makes it possible to circulate the water, leading to improvement of a resource utilization efficiency of the fuel cell system 200. The off gas passage 103 branches to extend to the hydrogen generator 50 to allow the off gas to be supplied as a combustion gas to the heater 4 of the hydrogen generator 50 (not illustrated in detail). This enables efficient use of the reformed gas. As a result, energy utilization efficiency of the fuel cell system improves.

As in the known fuel cell system (see patent document 1), the hydrogen generator 50 is configured to operate in association with the operation of the fuel cell 100. For example, the amount of the material fed from the material feed device 2A is controlled according to a power generation amount of the fuel cell 100. Thereby, unnecessary generation of the reformed gas is suppressed. Thus, the fuel cell system 200 is able to achieve efficient operation.

The controller 12 is configured to detect start-up and stop signals from the fuel cell 100. Because the hydrogen generator 50 operates in association with the fuel cell 100, the controller 12 counts the number of times n by utilizing the start-up and stop signals from the fuel cell 100, and counts the accumulated operation time h based on the start-up and stop signals from the fuel cell 100. Thereby, efficient and rational control configuration of the fuel cell system 200 is achieved.

The inventors found that in the fuel cell system 200, the hydrogen generator 50 was able to stably supply, to the fuel cell 100, the reformed gas with reduced CO concentration, and the fuel cell 100 was able to maintain a stable power generation output after the start-up and stop of 2000 times and after the operation time exceeding 10000 h.

Thus, in this embodiment, since the hydrogen generator 50 operates in association with the fuel cell 100, the fuel cell system 200 is able to achieve efficient and rational operation.

Embodiment 6

Figure 11:
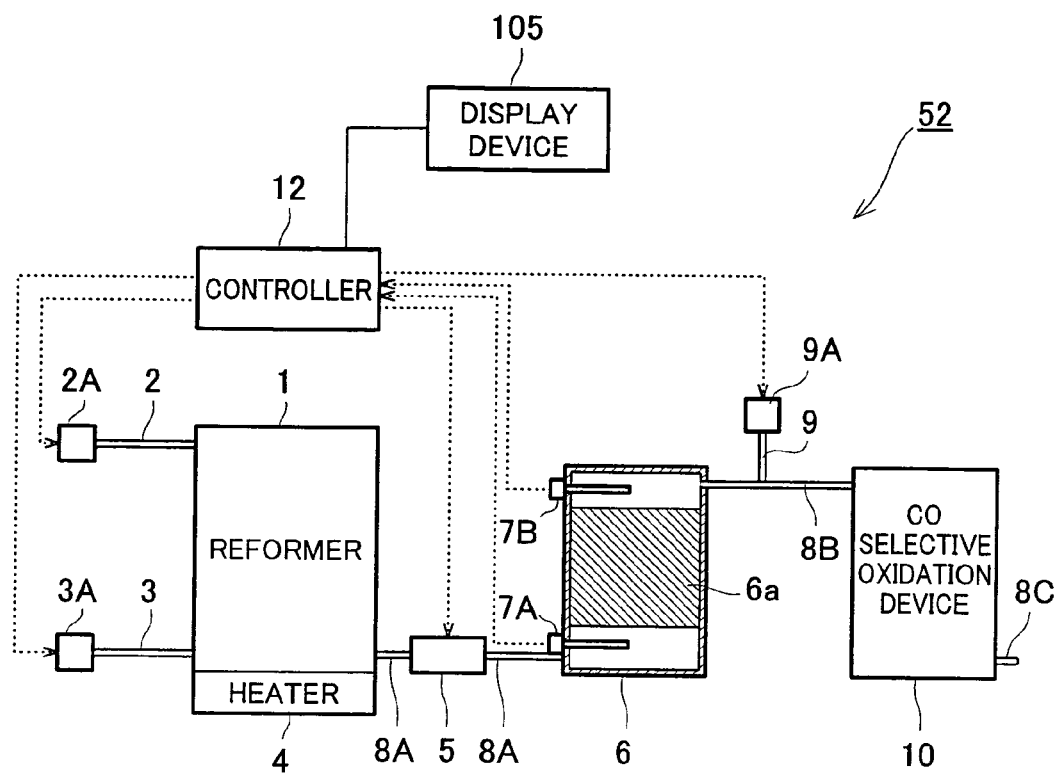
FIG. 11 is a view schematically showing a construction of a fuel cell system according to an embodiment 6 of the present invention.

FIG. 11 is a view schematically showing a hydrogen generator of an embodiment 6 of the present invention. A hydrogen generator 52 of FIG. 11 is identical to the hydrogen generator 50 of FIG. 1 except that the controller 12 has an operation display/output device (output device) 105. So, the other configuration and operation of the hydrogen generator 52 will not be described, and only a difference will be described.

The operation display/output device 105 is configured to display or output the number of times n counted by the controller 12, and is constructed of a display device or a printer. This makes it possible to easily recognize the number of times n from outside. So, it can be determined anytime whether or not to increase the temperature of the reformed gas flowing in the shift converter 6. It should be appreciated that the same configuration and effects are able to be achieved using the S/C ratio of the reformed gas.

For example, the operation display/output device 105 may conduct display or output by operating the controller 12 during maintenance of the hydrogen generator 50. In this case, an operator appropriately operates the controller 12 based on the number of times n displayed on or output from the operation display/output device 105 to allow the temperature of the reformed gas flowing in the shift converter to increase and the temperature of the shift reaction catalyst to increase, or otherwise to allow a program for increasing the S/C ratio to run. Since the operator checks the number of times n and changes the controlled temperature Tn, Tnh or the controlled S/C ratio as necessary, in addition to the control operation of the controller 12, the operation of the hydrogen generator 52 is able to be controlled more correctly.

Embodiment 7

Figure 12:
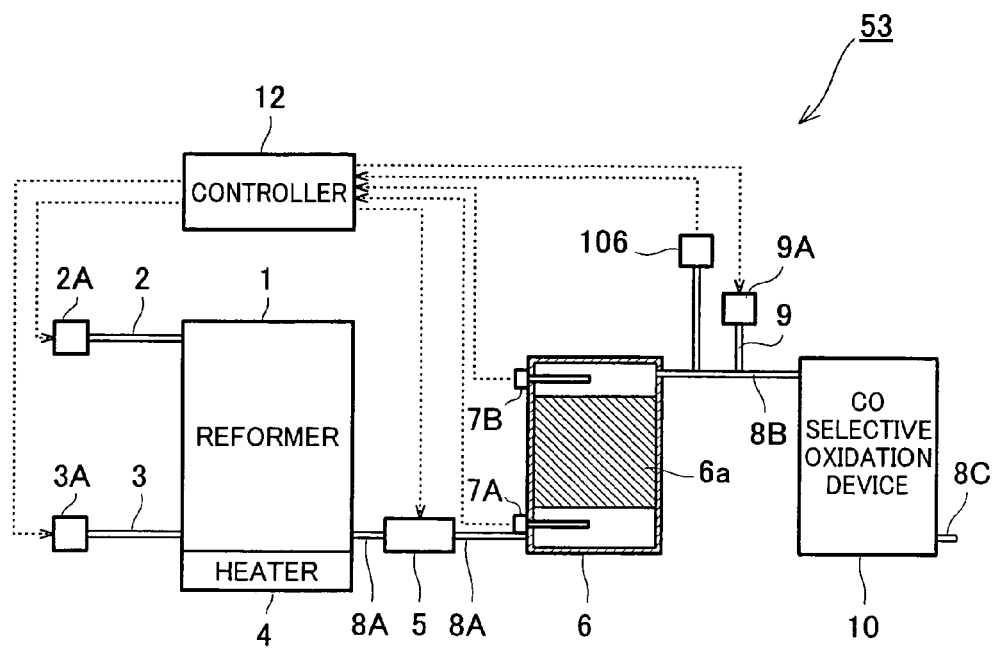
FIG. 12 is a view schematically showing a construction of a fuel cell system according to an embodiment 7 of the present invention.

FIG. 12 is a view schematically showing a hydrogen generator of an embodiment 7 of the present invention. A hydrogen generator 53 of FIG. 12 is identical to the hydrogen generator 50 of FIG. 1 of the embodiment 1 except that the hydrogen generator 53 is equipped with a CO concentration detector 106. The other configuration and operation of the hydrogen generator 53 will not be described, and only a difference will be described.

The CO concentration detector 106 is configured to detect the CO concentration of the reformed gas that has flowed through the shift converter 6. In this embodiment, the detector 106 is disposed on the reformed gas passage 8B. The CO concentration detector 106 may be of an infrared ray absorption type, a catalytic combustion type, etc. In this embodiment, the CO concentration detector of the infrared ray absorption type is used. A value detected by the CO concentration detector 106 is sent to the controller 12. An upper limit value z corresponding to the detected value from the CO concentration detector 106 is pre-stored in the controller 12. In this embodiment, the upper limit value z is set so that the concentration of CO in a dry gas base % is set to 0.5%. The upper limit value z is set according to the detected value from the CO concentration detector 106, or a voltage value, a current value of an output signal of the detected value, etc.

The controller 12 compares the detected value from the CO concentration detector 106 to the upper limit value z and increases the temperature or the S/C ratio of the reformed gas flowing in the shift converter 6 when the detected value from the CO concentration detector 106 is larger than the upper limit value z. In this embodiment, the controller 12 controls a cooling ability of the reformed gas cooler 5.

Alternatively, the controller 12 retrieves the Tn–Xn data base based on the upper limit value z to detect the controlled temperature Tnz corresponding to the upper limit value z. The controller 12 retrieves the n–Tn data base based on the controlled temperature Tnz to detect the number of times nz corresponding to the upper limit value z. The controller 12 updates the counted number of times n to n=nz. Thereby, the controller 12 controls the cooling ability of the reformed gas cooler 5 based on the flowchart of FIG. 3. In addition, the controller 12 controls the amount of air supplied from the air supply device 9A to enable the CO selective oxidation to promote in the CO selective oxidation device 10, thus decreasing the CO concentration of the reformed gas in the reformed gas passage 8C.

Thus, in accordance with this embodiment, since it is possible to determine whether or not to increase the temperature or the S/C ratio of the reformed gas flowing in the shift converter by detecting the concentration of CO, the hydrogen generator 50 is able to maintain an ability to supply the reformed gas containing less CO for a long time period while dealing with degradation of the catalytic activity of the shift reaction by a reliable and simple method.

The above mentioned embodiments may be carried out in combination. To be specific, the present invention may be carried out by combining the alternative example 1 of the embodiment 1 with the embodiments 2 to 7, by combining the embodiment 3 with the embodiment 1 and the embodiments 4 to 7, by combining the embodiment 4 with the embodiments 2, 3, 5, 6, and 7, by combining the embodiment 5 with the embodiments 2, 3, 4, 6, and 7, by combining the embodiment 6 with the embodiments 2, 3, 4, 5 and 7, by combining the embodiment 7 with the embodiments 2, 3, 4, 5, and 6.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

Since the present invention is configured to control a shift reaction based on the number of times of start and/or stop of the shift reaction, it is useful as a hydrogen generator that is able to maintain an ability to supply a reformed gas containing less CO for a long time period while dealing with degradation of a catalytic activity of the shift reaction by a reliable and simple method, an operation method thereof, and a fuel cell system.

The invention claimed is:

1. A method of operating a hydrogen generator comprising the steps of:
   (a) heating a reformer by a heater;
   (b) causing a steam reforming reaction to proceed to generate a reformed gas by said reformer;
   (c) causing a shift reaction of carbon monoxide in the reformed gas to proceed by a shift converter;
   (d) counting the number of times of start-up and/or stop of said hydrogen generator including said reformer, said shift converter, and said heater; and
   (e) counting an accumulated operation time of said hydrogen generator,
   wherein the step (c) includes:
   step (c1) causing the shift reaction to proceed at a first controlled temperature if the counted number of times of start-up and/or stop of said hydrogen generator is less than a predetermined number of times,
   step (c2) causing the shift reaction to proceed at a second controlled temperature higher than the first controlled temperature if the counted number of times of start-up and/or stop of said hydrogen generator is not less than the predetermined number of times,
   (c3) causing the shift reaction to proceed at a third controlled temperature if the counted accumulated operation time of said hydrogen generator is less than a predetermined time, and
   (c4) causing the shift reaction to proceed at a fourth controlled temperature higher than the third controlled temperature if the counted accumulated operation time of said hydrogen generator is not less than the predetermined time.

2. The method of operating a hydrogen generator according to claim 1, wherein
   in step (c1), the shift reaction is caused to proceed at the first controlled temperature by adjusting a temperature of the reformed gas flowing into said shift converter; and
   in step (c2), the shift reaction is caused to proceed at the second controlled temperature by adjusting the temperature of the reformed gas flowing into said shift converter.

3. A method of operating a fuel cell system, the method comprising:
   (a) heating a reformer by a heater;
   (b) causing a steam reforming reaction to proceed to generate a reformed gas by said reformer
   (c) causing a shift reaction of carbon monoxide in the reformed gas to proceed by a shift converter;
   (d) counting the number of times of start-up and/or stop of said fuel cell system comprising said hydrogen generator including said reformer, said shift converter, and said heater, and a fuel cell; and
   (e) counting an accumulated operation time of said hydrogen generator,
   wherein the step (c) includes:
   step (c1) causing the shift reaction to proceed at a first controlled temperature if the counted number of times of start-up and/or stop of said hydrogen generator is less than a predetermined number of times,
   step (c2) causing the shift reaction to proceed at a second controlled temperature higher than the first controlled temperature if the counted number of times of start-up and/or stop of said hydrogen generator is not less than the predetermined number of times,
   (c3) causing the shift reaction to proceed at a third controlled temperature if the counted accumulated operation time of said hydrogen generator is less than a predetermined time, and
   (c4) causing the shift reaction to proceed at a fourth controlled temperature higher than the third controlled temperature if the counted accumulated operation time of said hydrogen generator is not less than the predetermined time.

4. The method of operating a fuel cell system according to claim 3, wherein:
   in step (c1), the shift reaction is caused to proceed at the first controlled temperature by adjusting a temperature of the reformed gas flowing into said shift converter; and
   in step (c2), the shift reaction is caused to proceed at the second controlled temperature by adjusting a temperature of the reformed gas flowing into said shift converter.

* * * * *